JOHN MILTON.

Improvement in Grain-Drills.

No. 126,826.  
Patented May 14, 1872.

126,826

UNITED STATES PATENT OFFICE.

JOHN MILTON, OF HILLSBOROUGH, VIRGINIA.

IMPROVEMENT IN GRAIN-DRILLS.

Specification forming part of Letters Patent No. 126,826, dated May 14, 1872.

Specification describing a new and Improved Feed Attachment for Grain-Drills, invented by JOHN MILTON, of Hillsborough, in the county of Loudoun and State of Virginia.

My invention is an improvement in the class of conveyers for grain, which consist of a screw arranged in a tube provided with inlet and outlet apertures, and arranged horizontally beneath a grain-hopper. My invention consists in providing the conveyer-tube or case with an oblique discharge-orifice, to insure a continuous and uniform discharge of the grain, as hereinafter described.

Figure 1:
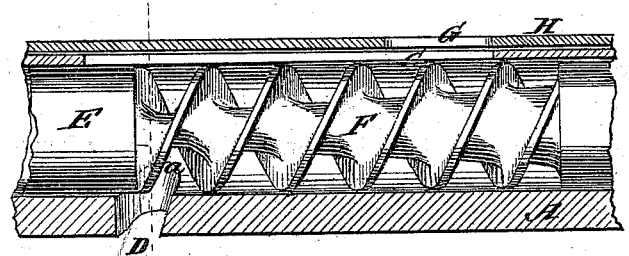
Figure 2:
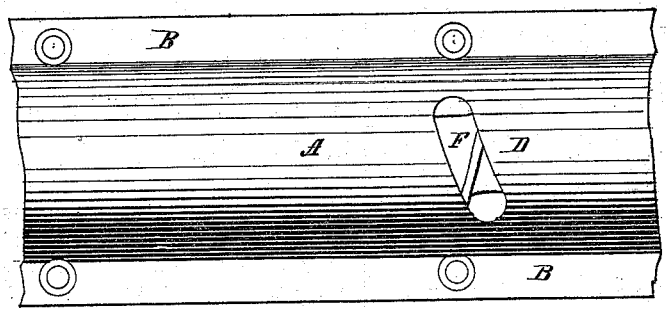
Figure 3:
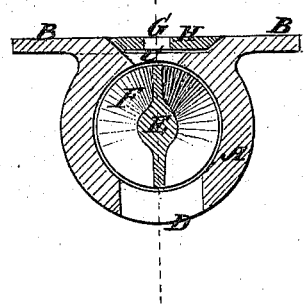

Figure 1 is a longitudinal section of a portion of the screw or conveyer-case and side elevation of the conveyer. Fig. 2 is a plan or bottom view; and Fig. 3 is a transverse section.

Similar letters of reference indicate corresponding parts.

A is a long tube extending the whole length of the hopper, arranged underneath it, and attached by the flanges B. In the upper side of this case there are as many long slots C as there are tubes for conducting the grain to the ground, and they are arranged at equal distances from each other. D is a discharge-orifice in the bottom of the case, one to each of the slots C and aforesaid conducting-tubes. E is a long shaft fitted in the tube A and extending from end to end of it. This shaft has a screw-conveyer section, F, for each dropping-tube, and slot C to receive the grain through the passage G of a slide-gate, H, and convey it laterally to the discharge D, as indicated in the drawing. This gate is arranged above the slots C, and also extends the whole length of the hopper, and has a passage, G, for each slot, so that the feed can be adjusted alike and simultaneously for all the tubes. These screws increase in the capacity of the grooves, which increase in depth as they approach the discharges D, and the feed is varied by shifting the passages G toward or from the said discharges D by sliding the gate H as required, said passages G being capable of delivering faster than the screws. The discharge-orifices D are made oblique to the long axis of the conveyer in the opposite direction to that of the conveyer-blades when passing over them, and they are of such length that the blades deliver in a continuous stream, beginning at one end, a, of the orifices, and ceasing at the other, and as one blade passes away and ceases to discharge another blade comes to the end a and begins to deliver, so that the grain is delivered in continuous streams.

Having thus described my invention, I claim as new and desire to secure by Letters Patent—

In combination with a screw-conveyer a case, A, provided with a discharge-orifice, D, made oblique to the long axis thereof, substantially as and for the purpose specified.

JOHN MILTON.

Witnesses:
EDGAR LITTLETON,
WILLIAM H. GRAY, Jr.